United States Patent [19]

Yahata et al.

[11] Patent Number: 5,005,044
[45] Date of Patent: Apr. 2, 1991

[54] AUTOMATIC MASKING DEVICE

[75] Inventors: Makoto Yahata; Fumihiko Nishida, both of Kyoto, Japan

[73] Assignee: Dainippon Screen Mfg. Co., Ltd., Kyoto, Japan

[21] Appl. No.: 410,201

[22] Filed: Sep. 21, 1989

[30] Foreign Application Priority Data

Oct. 14, 1988 [JP] Japan ............... 63-260295

[51] Int. Cl.$^5$ ........................... G03B 27/52
[52] U.S. Cl. ..................... 355/40; 355/71; 355/75
[58] Field of Search ........... 355/71, 75, 40, 41, 355/54, 244

[56] References Cited

FOREIGN PATENT DOCUMENTS 60-140960 9/1985 Japan .

Primary Examiner—L. T. Hix
Assistant Examiner—D. Rutledge
Attorney, Agent, or Firm—Lowe, Price, Leblanc, Becker & Shur

[57] ABSTRACT

A masking device employed for a composer and the like for forming a desired opening portion by covering a glass plate holding an original includes a pair of light intercepting devices for covering the glass plate from the front and rear and left and right directions. One end of each of the light intercepting devices includes a holding portion for holding an end portion of masking sheet for covering the glass plate and a member for defining an opening portion on the glass plate. The holding member and the opening portion defining member in the front and rear directions are provided spaced part from each other in the up and down directions, and the light intercepting device in the left and right directions are posed in an opening portion formed between the holding member and the opening portion defining member of the light intercepting device in the front and rear directions to define the opening portion in left and right directions.

13 Claims, 7 Drawing Sheets

FIG.3
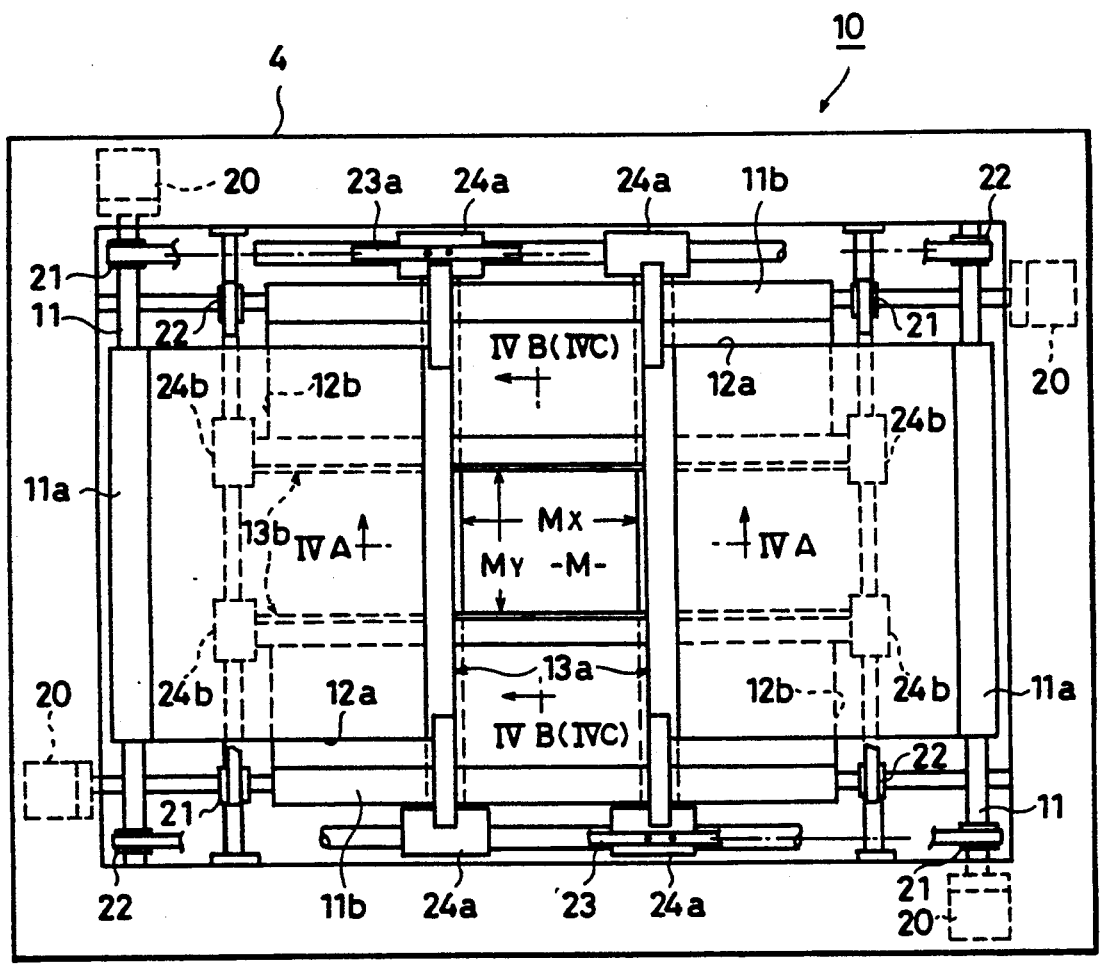
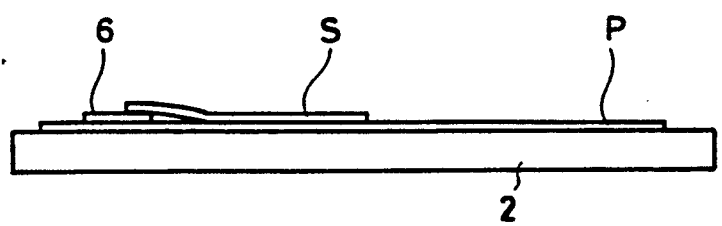
FIG.7A
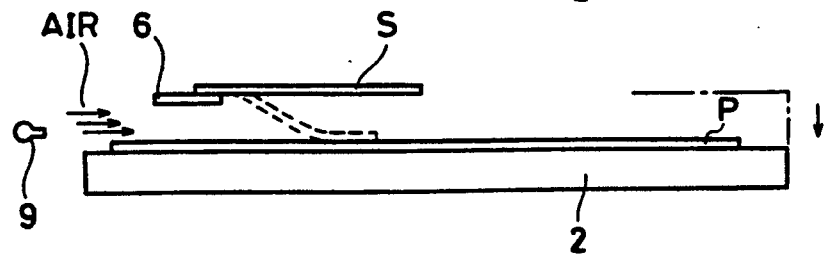
FIG.7B

AUTOMATIC MASKING DEVICE

BACKGROUND OF THE INVENTION

Field of the Invention

The present invention relates to an automatic masking device employed in a composer, composing camera and the like used for multi-duplication during the process of reproduction. More specifically, the present invention relates to an automatic masking device enabling precise exposure of the area defined by masks.

Description of the Related Art

An automatic masking device of interest to the present invention is disclosed in Japanese Utility Model Laying-Open No. 60-140960. FIG. 10 is a plan view showing the automatic masking device disclosed in this document and FIGS. 11A and 11B are cross sections of the portion shown by the lines XIA—XIA and XIB—XIB of FIG. 10. Referring to FIGS. 10, 11A and 11B, the conventional automatic masking device comprises 4 masking units 110 respectively arranged at respective end surfaces of a rectangular transparent plate 105. Each of the masking units 110 comprises a roll shaft 111 arranged in parallel to each of the end surfaces of the transparent plate 105, two pairs of flexible non-transparent masking sheets 112a and 112b arranged in intersecting directions, a moving block 124 for moving tip end portions of the masking sheets 112a and 112b to cover the transparent plate 105, a driving screw 123 for guiding the moving block 124 and the reversible motor 124 for driving the driving screw 123. The masking sheets 112a and 112b are wound around the roll shaft 111 forming winding rollers 111a and 111b. The sheets are large enough to cover from one end to the other end of the transparent plate 105 when they are yielded. Leading edges 113a and 113b for defining end portions of the masking sheets 112a and 112b are provided at end portions of the respective masking sheets 112a and 112b. A mask opening $M_Y$ in the front and rear directions is defined by 114b facing a pair of reading edges 113b in the front and rear directions, while portions facing a pair of leading edges 113a in the left and right directions define the mask opening $M_X$ in the left and right directions. The leading edges 113a and 113b are made of thick and rigid plate material so that the masking sheets 112a and 112b can be yielded against the rolling-back force of the roll shaft 111.

Generally, a masking device in a composer, for example, a horizontal composer comprises two pairs of masking sheets 112a and 112b arranged above the transparent plate 105. Plate making is carried out in the following manner by this device. An original film S is placed at a prescribed position on the transparent plate 105, as shown by a chain dotted line in FIG. 10. The two pairs of masking sheets 112a and 112b are arranged on the transparent plate 105 to cover four end surfaces of the original film S. A photosensitive material such as a PS plate P is placed below the transparent plate 105 and under the original film S. Light is emitted from a light source provided above the transparent plate 105 in this state. Consequently, an image of the original film S is formed on the photosensitive surface such as the PS plate P in contact with the original film S through the mask opening M (defined by $M_X$ and $M_Y$) formed on the transparent plate 105. After the image of the original film S is formed at a prescribed position, the masking sheets 112a and 112b are arranged such that a different unexposed area only is opened. Thereafter, the image of the original film S is formed on the photosensitive material through the same operations. By repeating the same process, a plurality of the images of the original film S are formed on the photosensitive surface P.

As described above, in a composer or the like, a plurality of originals are formed on the transparent surface P with end surfaces thereof common to each other. Therefore, it is necessary to prevent blurring due to diffraction of the light at end surface portions of each of the originals.

However, since the transparent plate 105 has some thickness, the dimension of the mask opening ($M_X$ and $M_Y$) and the dimension of an area to be exposed ($E_X$, $E_Y$) do not coincide with each other. Consequently, blurring due to the diffraction of the light from the light source inevitably occurs around the area to be exposed $E_X$, $E_Y$ on the photosensitive surface (see FIGS. 11A and 11B).

In the above described conventional device, the leading edges 113a and 113b are formed of thick plate material (about 3 mm). When a pair of leading edges 113a are arranged intersecting with and over the other pair of leading edges 113b arranged close to the transparent plate 105, the distance between the masking sheet 112a and the original film S is the sum of the thickness of the transparent plate 115, the thickness of the masking sheet 112b (about 0.2 mm) and the thickness (about 3 mm) of the leading edge 113b. Consequently, images are blurred at broader areas around the area $E_X$ to be exposed defined by the leading edge 113a.

SUMMARY OF THE INVENTION

Therefore, one object of the present invention is to reduce areas in which images are blurred around the area to be exposed in a masking device.

Another object of the present invention is to make thinner the leading edge which is to be in contact with the transparent plate.

A further object of the present invention is to divide an end portion of the leading edge into a portion supporting the masking sheet and a portion defining the area to be exposed in an automatic masking device.

The above described objects of the present invention can be attained by a masking device for masking areas which are not to be exposed of a photosensitive material, when images of an original are to be exposed on the photosensitive material, comprising a transparent plate provided on the original, having a pair of end portions in a first direction and a pair of end portions in a second direction intersecting the first direction; a pair of first light intercepting devices having one end fixed close to one end portion of the transparent plate in the first direction for covering the transparent plate from both sides in the first direction; and a pair of second light intercepting devices having one end fixed close to one end portion of the transparent plate in the second direction for masking the transparent plate from both sides in the second direction. The first light intercepting device comprises a first cover for covering the transparent plate and a member for defining an end portion, different from the one end, in the first direction of the first cover. The end portion defining member comprises a first cover holding device and a member for defining an opening in the first direction arranged close to the transparent plate. There is a first space between the first cover holding member and the member for defining the opening in the first direction. The second light intercepting device comprises a second cover for covering the transparent plate and a member for defining an end portion in the second direction for defining the other end, different from the said one end, in the second direction of the second cover. The member for defining the end portion in the second direction comprises a second cover holding device for holding the end portion of the second cover and a member for defining an opening in the second direction. The member for defining the opening portion in the second direction is provided at least to pass through the first space.

In the masking device in accordance with the present invention, the member for defining the end portion in the first direction is divided into a first cover holding member and a member for defining an opening portion in the first direction. The first cover holding member receives tension of the first cover and the member for defining the opening portion in the first direction does not receive any force, and therefore, it is formed of a thin plate. The member for defining the end portion in the second direction is provided adjacent to and above the member for defining the opening portion in the first direction which is formed of a thin plate. Therefore, when light is emitted from above the masking device to expose the photosensitive material below the masking device, blurring in the area to be exposed due to the diffraction of the light can be suppressed, since the member for defining the opening in the first direction is thin. Consequently, the areas in which the images are blurred can be reduced in the periphery of the area to be exposed in a masking device.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a plan view of an automatic masking device in accordance with the present invention;

FIGS. 7A and 7B illustrate operation of a nozzle of the conveyor type multiple image printing machine shown in FIG. 5;

DESCRIPTION OF THE PREFERRED EMBODIMENTS

Figure 5:
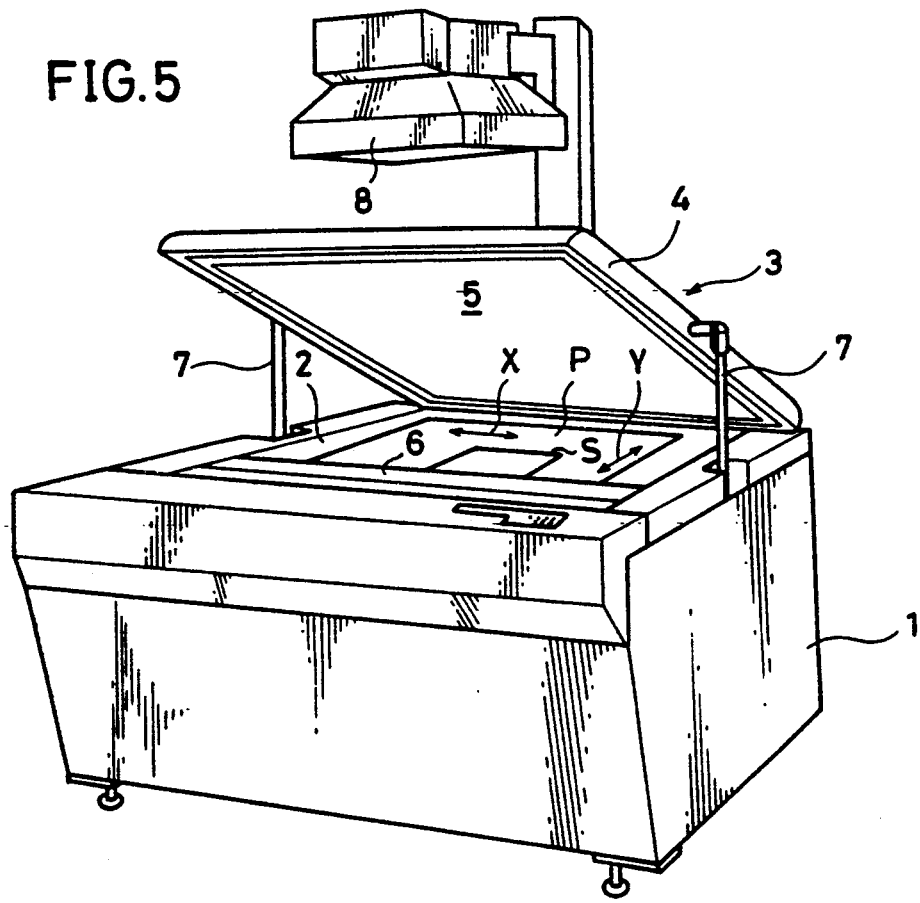
FIG. 5 is a perspective view of a conveyor type multiple image printing machine to which the masking device of the present invention can be applied.

A conveyor type multiple image printing machine to which the automatic masking device of the present invention is applied will be briefly described with reference to FIGS. 5 and 6.

The conveyor type multiple image printing machine comprises a printing table 2 which can be elevated and lowered provided on an upper surface of a body 1; a transparent plate 5 on a lower surface of an edge frame 4; an upper frame 3 which can be opened and closed provided on the printing table 2; a masking device 10 provided on the side of the upper surface of the transparent plate 5 which will be described later; an original film conveying belt 6 provided movable in the X-Y directions in the figure in relation to the printing table 2; an evacuating apparatus (not shown) for vacuum contact; and a light source 8 for printing. An original film S is positioned by means of the original conveying belt 6 in relation to the photosensitive material P such as a PS plate placed on the printing table 2. The image of the original S is formed on the photosensitive material P in this state, and the film S is moved to another position. In this manner, the film S is successively positioned by means of the original conveying belt 6, so that a plurality of the images of the original S are printed on the photosensitive material P.

Figure 6:
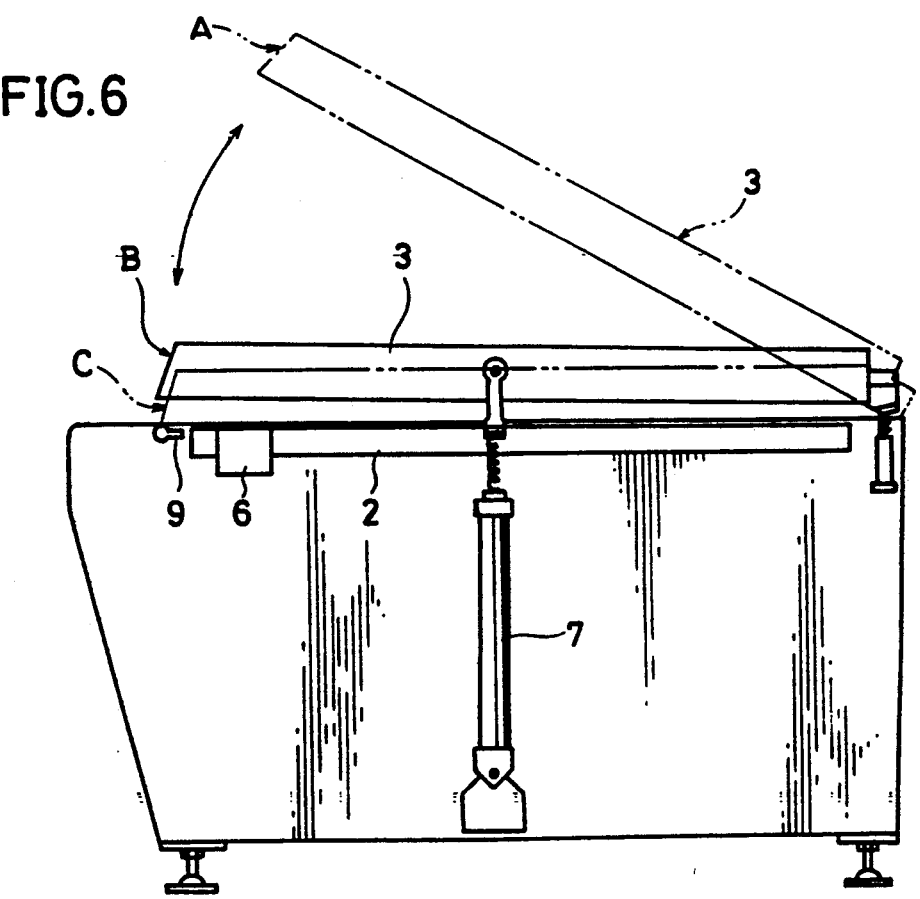
FIG. 6 is a side view of a main portion of the conveyor type multiple image printing machine shown in FIG. 5.

The upper frame 3 can be moved by an air cylinder 7 to a full open attitude A, a half open attitude B and a closed attitude C, as shown in FIG. 6. Exchange of the photosensitive material P or the original S is carried out in the full open attitude A. The original S is moved in the X-Y directions by the operation of the belt 6 to be positioned on the photosensitive material P in the half open attitude B. The original S is brought into contact with the photosensitive material P for printing in the closed attitude C.

The original conveying belt 6 is wound around pulleys arranged in the left and right side of the printing table 2 to surround the printing table 2. The original conveying belt is movable also in the front and rear directions (Y) of the printing table 2.

The original film has a front edge fixed on the original conveying belt 6 by means of a sticky tape and the film moves in the X-Y directions in relation to the photosensitive material positioned and placed on the printing table 2 to be positioned at a prescribed position of the photosensitive material P. On this occasion, the printing table 2 is a little lowered and air is emitted from an air nozzle 9 so as to prevent the rear end of the original S from being suspended and in contact with the photosensitive material.

This method will be described with reference to FIGS. 7A and 7B. In printing, the original S is placed in contact with the photosensitive material P as shown in FIG. 7A. When the original is moved, the printing table 2 is lowered as shown in FIG. 7B. On this occasion, since one end of the original S is fixed on the positioning belt 6, the other end, which is not fixed, of the original S is suspended as shown by the dotted lines in FIG. 7B. If the suspended original S happens to be in contact with the photosensitive material P, the photosensitive material P may possibly be damaged. Therefore, when the original is to be moved, air is emitted from the air nozzle 9 as shown in FIG. 7B and the original S is horizontally held in the air as shown by the solid line in FIG. 7B.

After the original S is positioned, the upper frame 3 is closed so that the original is in contact with the photosensitive material P. The masking device 10 is operated to form a desired mask opening. Printing is carried out through the mask opening.

The masking device of the present invention will be described in the following with reference to FIGS. 1 to 4C.

Referring to FIG. 3, the masking device 10 comprises two pairs of retractable masking sheets or covers 12a, 12a (12b, 12b) which adjustably define a mask opening $M_X$ in the left and right directions and a mask opening $M_Y$ in the front and rear directions. The size of the opening M defined by $M_X$ and $M_Y$ is selected to be little smaller than the size of the original S, as described with reference to FIG. 9. The retractable covers masking sheets 12a·12b, are retractably wound around rollers 11a and 11b, respectively. Tip ends thereof are respectively fixed to leading edges 13a and 13b and the mask opening M is defined to have prescribed dimensions $M_X$ and $M_Y$ by a mask driving mechanism.

The mask driving mechanism comprises a driving motor 20 through a driving gear; endless transmission belts 23 wound around driving pulleys 21 and driven pulleys 22 of a pair of roll shafts 11·11; and moving blocks 24a·24b for the leading edge fixed on the endless transmission belt 23. By independently driving each of the moving blocks 24a·24b and the roll shafts 11, the mask opening M is defined. An original film S (not shown) is positioned below the mask opening M under the transparent plate 5. The image of the original film S is printed at a prescribed position of the photosensitive material P by the light transmitted through the mask opening M.

The leading edge assemblies 13a·13a of the masking sheets 12a·12a comprise mask opening defining plates 14a formed of a thin plate arranged close to the transparent plate 5 for defining the mask opening $M_X$ in the left and right retractably holding the corresponding cover masking sheet 12a. The masking sheet leading plate 15a and the mask opening defining plate 14ak are separated into an upper part and a lower part. Mask opening defining plates 14b of the other pair of leading edges 13b·13b are arranged intersecting the upper part of the mask opening defining plate 14a.

The cover masking sheet 12a, is rolled up by the shaft 11 by means of a rolling spring, not shown, and a constant tension is applied thereto. The tension is applied only to the masking sheet leading plate 15a and not to the mask opening defining plate 14a. Therefore, the mask opening defining plate 14a can be made of a relatively thin plate member (for example having the thickness of 0.6 to 0.8 mm).

Figure 2:
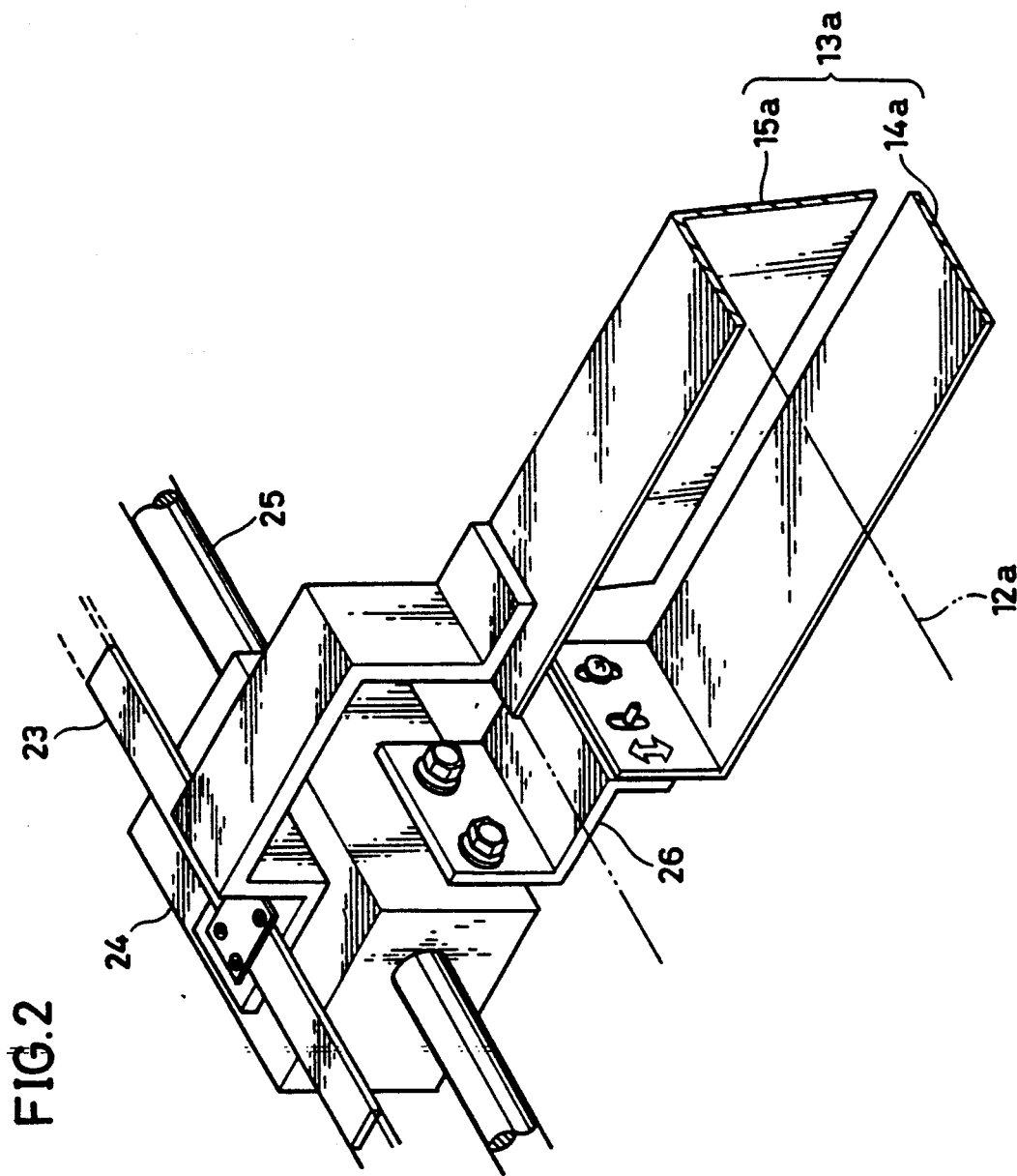
FIG. 2 is an enlarged perspective view of a portion shown by II in FIG. 1.

As shown in FIG. 2, the mask opening defining plate 14a is supported movable in up and down directions by means of a suspension 26 fixed to the moving block 24a. When the defining plate 14a is moved, the lower surface thereof is in contact with the upper surface of the transparent plate 5, and the defining plate 14a is adapted to move along the bend of the transparent plate 5. Structured in this manner, the mask opening defining plate 14a will not be lift away from the upper surface of the transparent plate 5. Therefore, there is no possibility of the area in which images are blurred being extended in the periphery of the mask opening defining plate 14a. The moving block 24a is moved along a guide bar 25.

Figure 1:
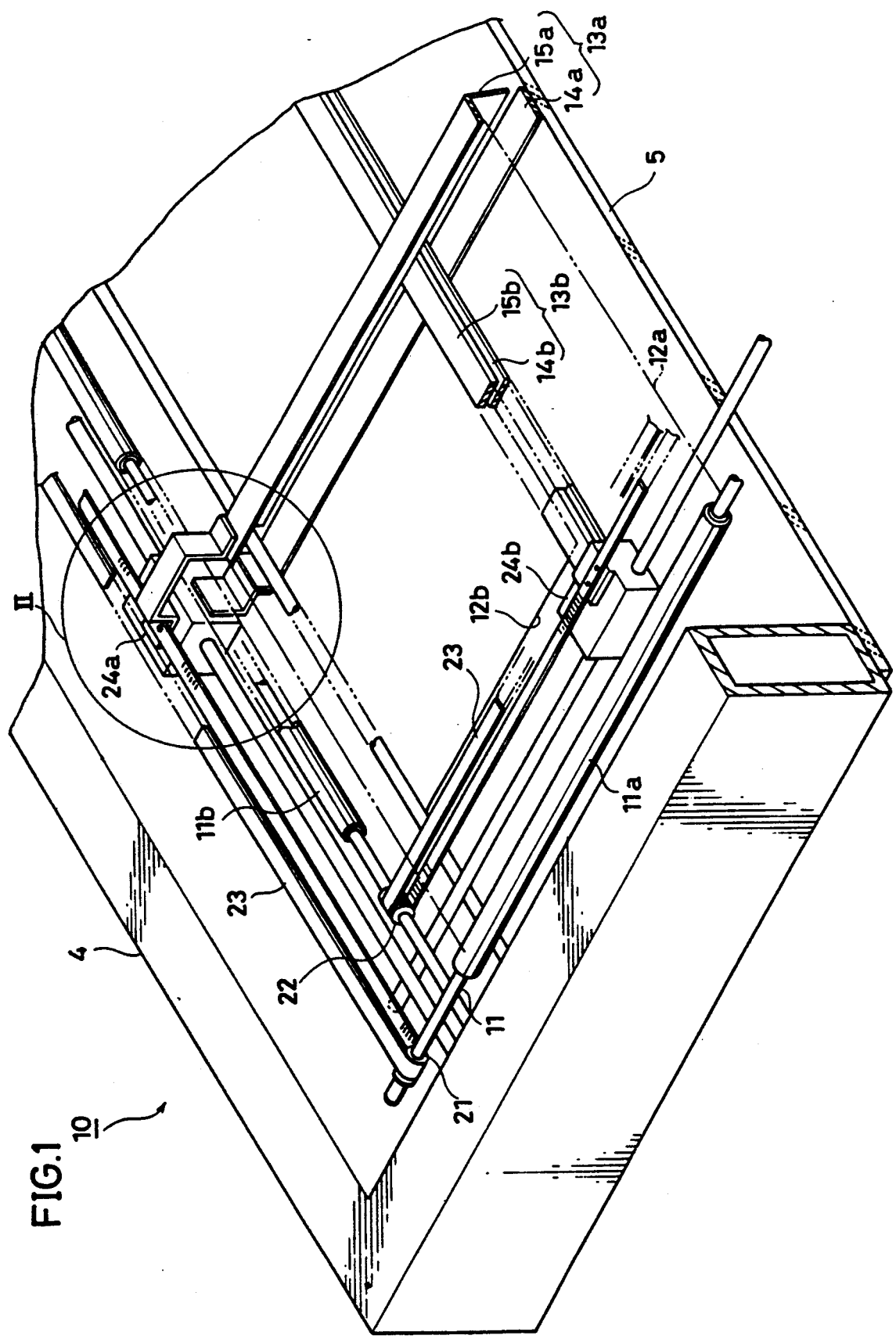
FIG. 1 is a perspective view showing a portion of a masking device in accordance with the present invention.

Meanwhile, a pair of leading edges 13b·13b defining the mask opening $M_Y$ in the front end rear directions also comprise mask opening defining plates 14b and masking sheet leading plates 15b, as shown in FIG. 1. Both are arranged separately in the upper and lower parts. The mask opening defining plate 14b is formed of a thin plate member which is supported movable in the up and down directions by the moving block 24b. Namely, the tension applied to the masking sheet 12b works on only the masking sheet leading plate 15b and not the mask opening defining plate 14b.

Figure 4A:
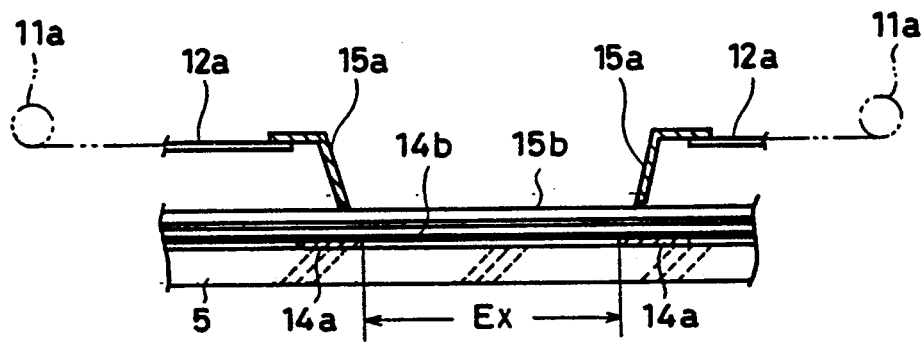
FIGS. 4A to 4C are cross sectional views of the portions shown by IVA—IVA, IVB—IVB and IVC—IVC of FIG. 3.
Figure 4B:
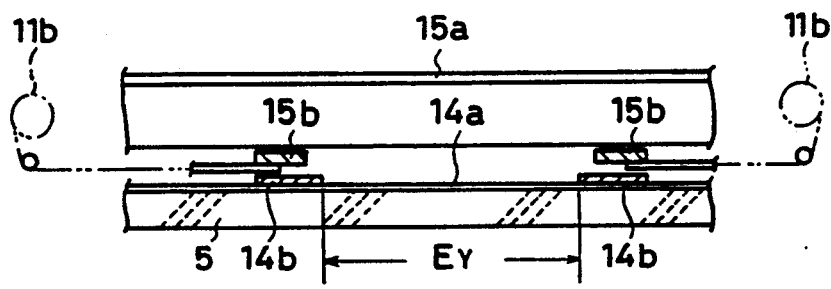
Figure 4C:
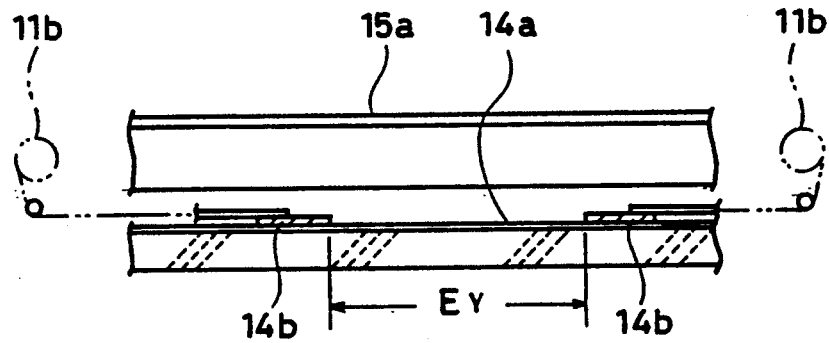

Therefore, as shown in FIGS. 4A and 4B, the leading edges 13b (including 14b and 15b) defining the opening portion $M_Y$ in the front and rear direction is arranged close to the mask opening defining plate 14a which is formed of a thin plate member (having the thickness of about 0.6 to 0.8 mm) defining the opening portion $M_X$ in the left and right directions arranged in contact with the transparent plate 5.

Figure 10:
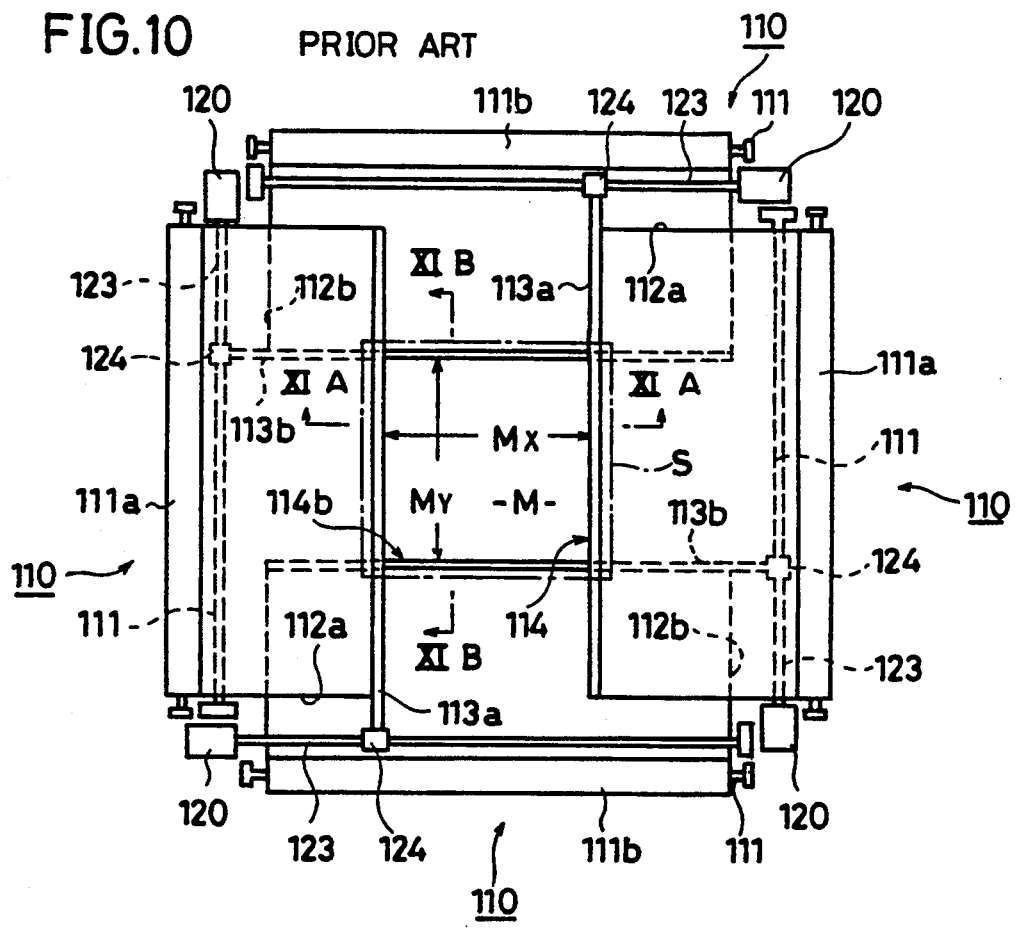
FIG. 10 is a plan view showing a main portion of a conventional masking device.
Figure 11A:
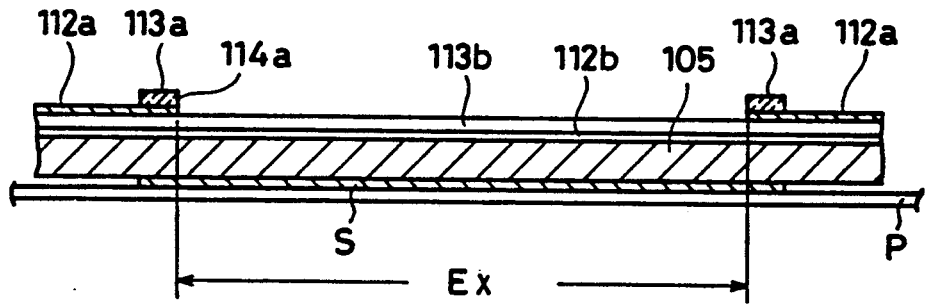
FIGS. 11A and 11B are cross sectional views of the portions shown by XIA—XIA and XIB—XIB of FIG. 10.
Figure 11B:
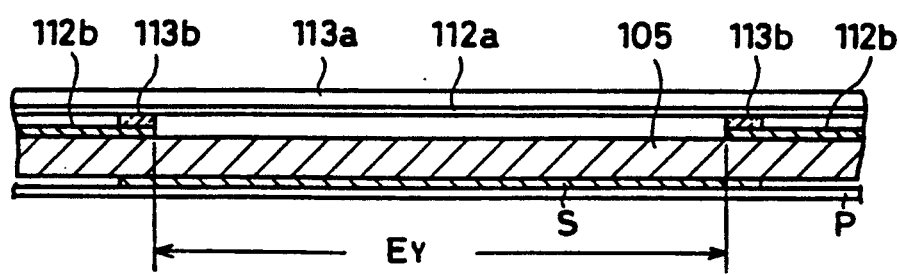

Namely, the thickness of the mask opening defining plate 14b in the left and right directions which influences the size of the area in which images are blurred in the periphery of the area $E_Y$ to be exposed in the front and rear directions is made about ¼ to 1/5 of a conventional one (about 3.2 mm, see 112b + 113b in FIG. 10B). Consequently, as shown in FIG. 4B, there remains little possibility of the area in which images are blurred extending near the periphery of the area $E_Y$ to be exposed in the front and rear directions.

The above described pair of leading edges 13b·13b may be formed integrally by a thick plate member and they need not be separated into the mask opening defining plate 14b and the masking sheet leading plate 15b. In that case, the edge side (mask opening defining portion) defining the mask opening $M_Y$ may be arranged neat and upper the mask opening defining plate 14a which is separately arranged as described above (see FIG. 4C).

When the pair of leading edges 13b·13b are separated into the mask opening defining plate 14b and the masking sheet leading plate 15b, only the mask opening defining plate 14b may be arranged between the mask opening defining plate 14a and the masking sheet leading plate 15a of the other pair of leading edges 13a·13a and the masking sheet leading plate 15b may be arranged above the other masking sheet leading plate 15a.

The present invention is especially advantageous when applied to a masking device which requires large light shading area. The reason for this is that even when the rolling up force applied to the masking sheet is large, the mask opening defining plate can be formed of a thin plate member.

Although a conveyor type multiple image printing machine has been described in the above embodiment, the present invention can be applied not only to machines of this type but also to original holders of a general horizontal composer (vertical composer) and the like.

Figure 8:
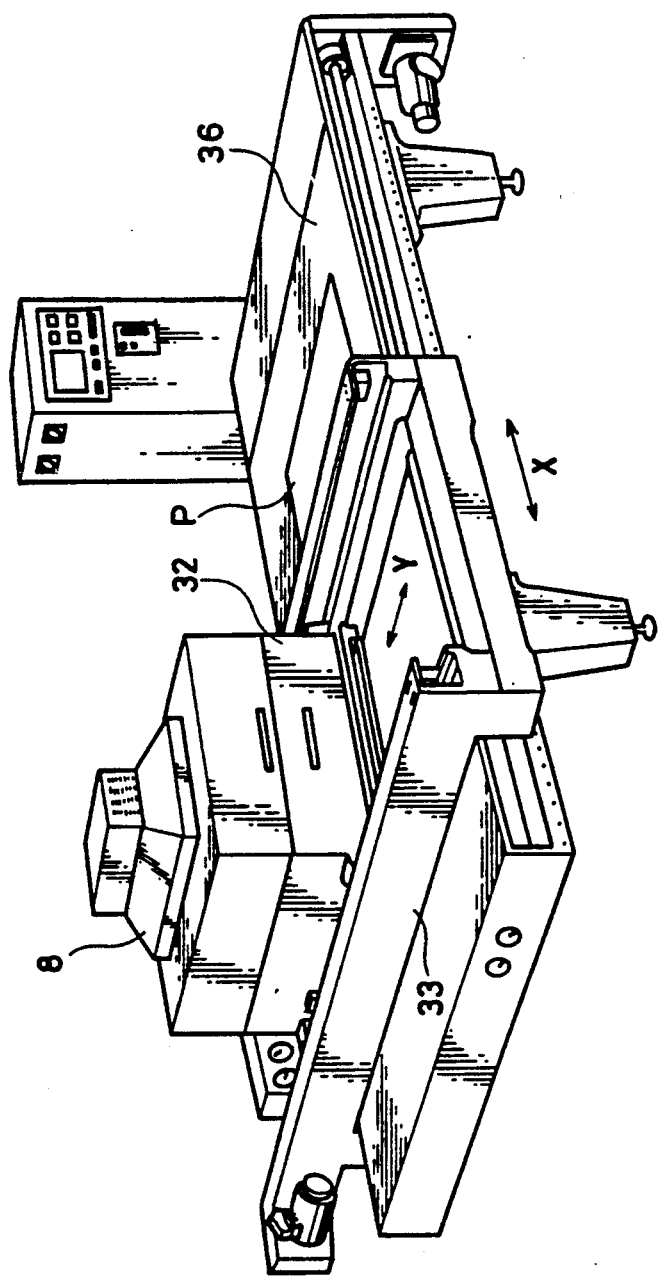
FIG. 8 is a perspective view of a horizontal composer to which the masking device of the present invention can be applied.
Figure 9:
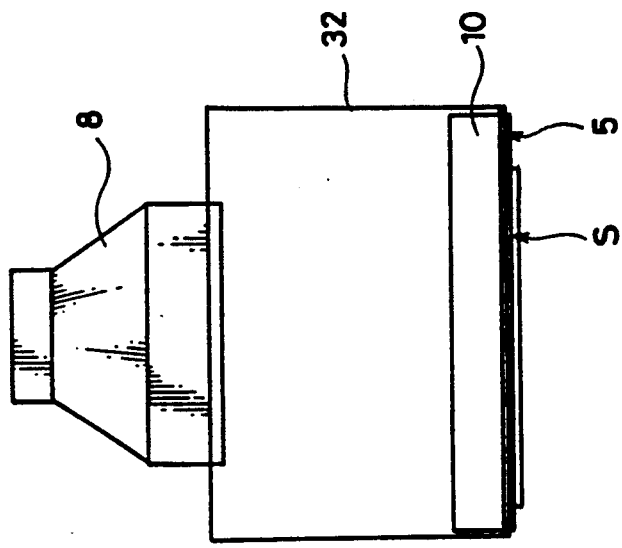
FIG. 9 is a cross sectional view of an original mounting table of the horizontal composer shown in FIG. 8.

Referring to FIGS. 8 and 9, an example of the present invention applied to a horizontal composer will be described. Referring to FIG. 8, a horizontal composer to which the masking device for the present invention is applied comprises a printing table 36 holding a photosensitive material P and an original table 32 provided relatively movable in parallel to the surface of the photosensitive material P on the printing table 36. The original table 32 moves in the Y direction, as shown, on a Y axis table 33, and the Y axis table 33 moves in the X direction, as shown, on the printing table 36, whereby the original table 32 is moved to an arbitrary position on the photosensitive material P in parallel to the surface of the photosensitive material P. The original table 32 comprises a printing light source 8 provided above and a transparent plate (not shown) holding an original film at the bottom portion thereof. In this horizontal composer, the automatic masking device is also provided on the transparent plate. The structure of the automatic masking device is the same as that applied to the above described conveyor type multiple image printing machine, so that the description thereof is not repeated.

Referring to FIG. 9, the positional relation between the original table 32 and the automatic masking device 10 will be described. The original table 32 comprises the automatic masking device 10 and a transparent plate (that is, an original holder) 5 provided therebelow. The automatic masking device 10 is moved upward and downward together with the transparent plate 5 by means of an elevating apparatus, not shown, in the original table 32. Therefore, the original film S can be brought into contact with the photosensitive material P held on the lower surface of the transparent plate 5. Generally, the original film S is attracted and held by a vacuum groove provided on the periphery of the lower surface of the transparent plate 5.

The masking device of the present invention applied to a vertical composer will be described in the following. In the vertical composer, a biasing spring should be preferably be provided so that the mask opening defining plates 14a and 14b abut the transparent plate 5 of the original holder.

The reason for this is as follows. The masking device 10 is arranged horizontally as shown in FIG. 3 in a horizontal composer, so that the opening defining plate 14a comes into contact with the transparent plate 5 by the weight of the defining plate 14a itself. However, in a vertical composer, the automatic masking device is arranged vertically. Since the transparent plate 5 is arranged erected vertically, the opening defining plate 14a does not come into contact with the transparent plate 5 by the weight of itself. Therefore, a biasing spring should be provided which forces the defining operate 14a to the transparent plate 5 to be in contact therewith.

Although a multiple image printing composer such as conveyor type multiple image printing machine has been described in the above embodiments, it goes without saying that the present invention can be applied to a so-called composer camera in which at least one original is taken on one photosensitive material.

As is apparent from the foregoing, at least a pair of leading edges comprise a mask opening defining plate and a masking sheet leading plate and the two plates are arranged separately such that the tension of the masking sheet does not work on the mask opening defining plate. Accordingly, the mask opening defining plate arranged adjacent to transparent plate can be made thin. Therefore, even when the mask opening defining portion of the other pair of leading edges is arranged adjacent to and intersecting with the upper side of the mask opening defining plate, the area in which images are blurred near the periphery of the area to be exposed caused by the other pair of the mask opening defining portions will not be so large as in the prior art.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A masking device for covering, when an image of an original is to be exposed on a photosensitive material, an area which is not to be exposed of said photosensitive material, comprising:

a light transmitting plate having a pair of end portions in a first direction and a pair of end portions in a second direction intersecting said first direction provided on said original;

a pair of first light intercepting means, each said first light intercepting means having one end thereof fixed near an end portion of said first direction of said plate for covering said plate from both sides in said first direction, each one of said first light intercepting means including a first cover for covering said plate and means for determining an end portion of said first cover in the first direction, each of said means for determining an end portion in the first direction including a first cover holding means for holding said end portion of the corresponding first cover, and means for defining an opening portion in the first direction arranged close to said plate, a first space existing between said first cover holding means and the associated means for defining an opening portion in said first direction; and a pair of second light intercepting means, each of said second light intercepting means having one end fixed near an end portion thereof in said direction of said plate, for covering said plate from both sides in said second direction, each one of said second light intercepting means including a second cover for covering said plate and means for defining an end portion of said second cover in said second direction, said means for defining an end portion in the second direction including a second cover holding means for holding said end portion of said cover and means for defining an opening portion in the second direction, at least part of said means for defining an end portion in the second direction being near said means for defining an opening portion in said first direction located in said first space.

2. A masking device according to claim 1, wherein each said second cover holding means is located in said first space.

3. A masking device according to claim 2, wherein each said second cover holding means and the associated means for defining an opening portion in said second direction are formed integrally.

4. A masking device according to claim 1, wherein said second cover holding means is arranged above said first cover holding means.

5. A masking device according to claim 1, further comprising a pair of guiding means provided on both end portions in said first direction of said plate, wherein each of the means for determining an end portion in the first direction move along said guiding means.

6. A masking device according to claim 1, wherein each of the first and second light intercepting means yieldably holds the corresponding cover.

7. A masking device according to claim 6, wherein each of the first and second light intercepting means retractably holds the corresponding cover.

8. A masking device for covering an area of a photosensitive material during exposure of the material, comprising:

first light intercepting means including a first cover for covering a part of the area of the material in a first direction during exposure and means for defining an end in the first direction, said means for defining an end in the first direction including means for holding an end of said first cover and means for defining a mask opening in the first direction, wherein said means for holding and said means for defining a mask opening are separated by a space;

second light intercepting means including a second cover for covering another part of the area of the material in a second direction during exposure and means for defining an end in the second direction, at least part of said means for defining an end in the second direction located in said space.

9. A masking device according to claim 8, wherein said means for defining an end in the second direction comprise means for holding an end of said second cover and means for defining the mask opening in the second direction.

10. A masking device according to claim 9, wherein the second cover holding means is located in said space.

11. A masking device according to claim 9, wherein the second cover holding means and the means for defining a mask opening in said second direction are formed integrally.

12. A masking device according to claim 8, further comprising a guiding means, wherein said means for defining an end in the first direction move along said guiding means.

13. A masking device for covering an area of a photosensitive material during exposure of the material, comprising:

a cover for masking at least part of the area of the material during exposure and an assembly defining an end of said cover, said assembly including a cover end holder and a member defining a masking edge, wherein said cover end holder and said member are separate from each other.

* * * * *